United States Patent
Kawaguchi

(10) Patent No.: US 8,890,653 B2
(45) Date of Patent: Nov. 18, 2014

(54) PLANT OPERATION APPARATUS AND PLANT OPERATION TRAINING SIMULATOR APPARATUS

(75) Inventor: Minoru Kawaguchi, Hyogo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 121 days.

(21) Appl. No.: 13/491,404

(22) Filed: Jun. 7, 2012

(65) Prior Publication Data

US 2013/0187751 A1 Jul. 25, 2013

(30) Foreign Application Priority Data

Jan. 24, 2012 (JP) ................. 2012-011659

(51) Int. Cl.
- G05B 19/00 (2006.01)
- H04Q 9/00 (2006.01)
- G05B 23/00 (2006.01)
- H04L 9/32 (2006.01)
- G06F 21/00 (2013.01)
- G06F 7/04 (2006.01)

(52) U.S. Cl.
USPC ........... 340/5.8; 340/5.6; 340/5.81; 340/5.86; 340/5.74; 713/168; 713/182; 726/7

(58) Field of Classification Search
USPC .................................. 340/5.8, 521
See application file for complete search history.

(56) References Cited

U.S. PATENT DOCUMENTS

| | | | |
|---|---|---|---|
| 5,796,827 A * | 8/1998 | Coppersmith et al. | 713/182 |
| 5,907,522 A * | 5/1999 | Teodoridis et al. | 368/10 |
| 7,202,773 B1* | 4/2007 | Oba et al. | 340/5.8 |
| 2007/0182544 A1* | 8/2007 | Benson et al. | 340/521 |
| 2011/0074542 A1* | 3/2011 | Nabeshima et al. | 340/5.62 |
| 2011/0227856 A1* | 9/2011 | Corroy et al. | 345/173 |

FOREIGN PATENT DOCUMENTS

| | | | |
|---|---|---|---|
| JP | 2001-142384 A | | 5/2001 |
| JP | 2001-195368 A | | 7/2001 |
| JP | 2007-140638 A | | 6/2007 |
| JP | 2008-196217 A | | 8/2008 |
| JP | 2009-181540 A | | 8/2009 |

* cited by examiner

Primary Examiner — Jennifer Mehmood
Assistant Examiner — Pameshanand Mahase
(74) Attorney, Agent, or Firm — Buchanan Ingersoll & Rooney PC

(57) ABSTRACT

A controller includes an authentication unit, an operator information database, an operation unit, a plant control logic processor and an operation history database. The authentication unit performs authentication when the operator in touch with the touch electrode inputs an operation to the operation unit. The operation unit obtains operator information of an operator authenticated by the authentication unit, and records an operation history of an operation input to an operation unit by the operator in the operation history database in relation to the operator information.

15 Claims, 14 Drawing Sheets

| ID | OPERATOR NAME | QUALIFIED TO OPERATE |
|---|---|---|
| 000001 | OPERATOR A | YES |
| 000002 | OPERATOR B | NO |
| ⋮ | ⋮ | ⋮ |

FIG.7

| ID | OPERATOR NAME | OPERATION DEVICE RELATING TO | QUALIFIED AS |
|---|---|---|---|
| 000001 | OPERATOR A | BOILER | BOILER OPERATOR, OPERATION TEAM LEADER |
| 000002 | OPERATOR B | TURBINE | TURBINE OPERATOR, OPERATION TEAM LEADER |
| 000003 | OPERATOR C | ELECTRIC SYSTEM | ELECTRIC SYSTEM OPERATOR, OPERATION TEAM LEADER |
| ⋮ | ⋮ | ⋮ | ⋮ |

FIG.8

| DATE AND TIME | OPERATION DEVICE FOR | OPERATION DETAIL | RESULT | OPERATOR NAME |
|---|---|---|---|---|
| 2010-10-30 12:31:05 | VALVE A | OPEN | OPENED | OPERATOR A |
| 2010-10-30 13:06:30 | PUMP B | START | FAILED | OPERATOR B |
| ⋮ | ⋮ | ⋮ | ⋮ | ⋮ |

FIG.11

PLANT OPERATION APPARATUS AND PLANT OPERATION TRAINING SIMULATOR APPARATUS

BACKGROUND OF THE INVENTION

1. Field of the Invention

The present invention relates to a plant operation apparatus and plant operation training simulator apparatus for authenticating an operator using living-body communication.

2. Description of the Related Art

One conventional authentication system widely used in an information terminal, such as a personal computer, is a method in which a user is identified by entering a password. Furthermore, in recent years, a method has been developed and actually used in which a user wearing a portable device storing data for authentication touches a touch electrode to be authenticated through living body (human body) communication.

For example, Patent Document 1 discloses an authentication system configured such that, when a user wearing a human-body side communication device touches a touch electrode of a display device, data for authentication stored in the human-body side communication device is loaded into the display device and authentication is performed.

In contrast, in a conventional plant operation apparatus, authentication for identifying an operator is not performed. Also, in a conventional plant operation training simulator apparatus, as disclosed in Patent Document 2, used for plant operation training, authentication for identifying an operator is not performed.

[Patent Document 1] JP-A-2009-181540
[Patent Document 2] JP-A-2001-142384

As above, in a conventional plant operation apparatus, authentication of an operator is not performed. So, it is impossible to find out who operated the plant operation apparatus. Due to this, even a person who is not qualified to operate the plant operation apparatus may operate the apparatus, which is a problem from the safety viewpoint. Furthermore, when plural operators operated the plant operation apparatus in relays and a plant anomaly occurred due to an incorrect operation, it is difficult to find out who performed the incorrect operation.

Furthermore, the plant operation training simulator apparatus is used for skill test for plant operator qualification as well as operation training. In a conventional skill test, plural operators (trainees) operate the apparatus in relays, and who performed what operation is identified only by visual observation by an instructor present at the test. So, in order to evaluate the test results accurately and fairly, it is necessary to objectively identify the operators who performed operation.

However, for an apparatus, such as a plant operation apparatus and plant operation training simulator apparatus, that is operated by plural operators in relays and needs to be promptly operated according to the situation, it is difficult to apply a conventional authentication method. For example, in a conventional authentication method using a password or living-body communication, once one operator succeeds in login, another operator can take over operation without another login. So, it is impossible to identify an operator who operated the apparatus. Furthermore, password entering takes time, which increases the workload for an operator and may obstruct emergency operation.

SUMMARY OF THE INVENTION

In order to solve the problems described above, it is an object of the present invention to provide a plant operation apparatus that can promptly and instantaneously perform authentication without increasing the workload for an operator and, even when plural operators operated in relays, can identify an operator who operated the apparatus.

Furthermore, it is another object of the invention to provide a plant operation training simulator apparatus that can promptly and instantaneously perform authentication without increasing the workload for an operator and, even when plural operators operated in relays, can identify an operator who operated the apparatus.

A plant operation apparatus in accordance with the invention includes: a mobile communication unit that is carried by an operator and stores an operator ID for identifying the operator; an apparatus-side communication unit that has a touch electrode for reading the operator ID from the mobile communication unit through living-body communication; an authentication unit that obtains the operator ID from the apparatus-side communication unit to authenticate the operator; an input unit to which an operation relating to a plant operation is input; and an operation unit that performs the plant operation based on the operation input to the input unit, wherein the apparatus-side communication unit becomes able to read the operator ID stored in the mobile communication unit when continuity is provided between the touch electrode and an electrode of the mobile communication unit through the body of the operator in touch with the touch electrode, wherein the authentication unit checks the operator ID obtained from the apparatus-side communication unit against an operator information database and, based on operator information including the checked operator ID, performs authentication and records the authentication result, and wherein the operation unit obtains the authentication result from the authentication unit, then, while the operator authenticated by the authentication unit is in touch with the touch electrode, performs the operation input to the input unit by the authenticated operator.

Furthermore, a plant operation training simulator apparatus in accordance with the invention including: a mobile communication unit that is carried by an operator and stores an operator ID for identifying the operator; a first apparatus-side communication unit that has a first touch electrode for reading the operator ID from the mobile communication unit through living-body communication; a first authentication unit that obtains the operator ID from the first apparatus-side communication unit to authenticate the operator; an input unit to which an operation relating to an operation of a plant is input for a plant simulator for performing simulated calculation of the state of the plant; and an operation unit that performs the simulated calculation by the plant simulator based on the operation input to the input unit, wherein the first apparatus-side communication unit becomes able to read the operator ID stored in the mobile communication unit when continuity is provided between the first touch electrode and an electrode of the mobile communication unit through the body of the operator in touch with the first touch electrode, wherein the first authentication unit checks the operator ID obtained from the first apparatus-side communication unit against an operator information database and, based on operator information including the checked operator ID, performs authentication and records the authentication result, and wherein the operation unit obtains the authentication result from the first authentication unit, then, while the operator authenticated by the authentication unit is in touch with the first touch electrode, performs the simulated calculation based on the operation input to the input unit by the authenticated operator.

According to the plant operation apparatus in accordance with the invention, when the operator carrying the mobile communication unit simply touches the touch electrode of the apparatus-side communication unit, authentication is promptly and instantaneously performed by the authentication unit, which does not increase the workload for the operator. Furthermore, even when plural operators operate the apparatus in relays, authentication is promptly and instantaneously performed for each of the operators and the authentication result is recorded, which allows identifying the operator who operated the apparatus.

According to the plant operation training simulator apparatus in accordance with the invention, when the operator carrying the mobile communication unit simply touches the first touch electrode of the first apparatus-side communication unit, authentication is promptly and instantaneously performed by the first authentication unit, which does not increase the workload for the operator. Furthermore, even when plural operators operate the apparatus in relays, authentication is promptly and instantaneously performed for each of the operators and the authentication result is recorded, which allows identifying the operator who operated the apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows a data configuration of an operator information database in accordance with the first embodiment of the invention;

FIG. 8 shows a data configuration of an operator information database in accordance with the first embodiment of the invention;

FIG. 11 shows a data configuration of an operation history database in accordance with the second embodiment of the invention;

DETAILED DESCRIPTION OF THE INVENTION

First Embodiment

Figure 1:
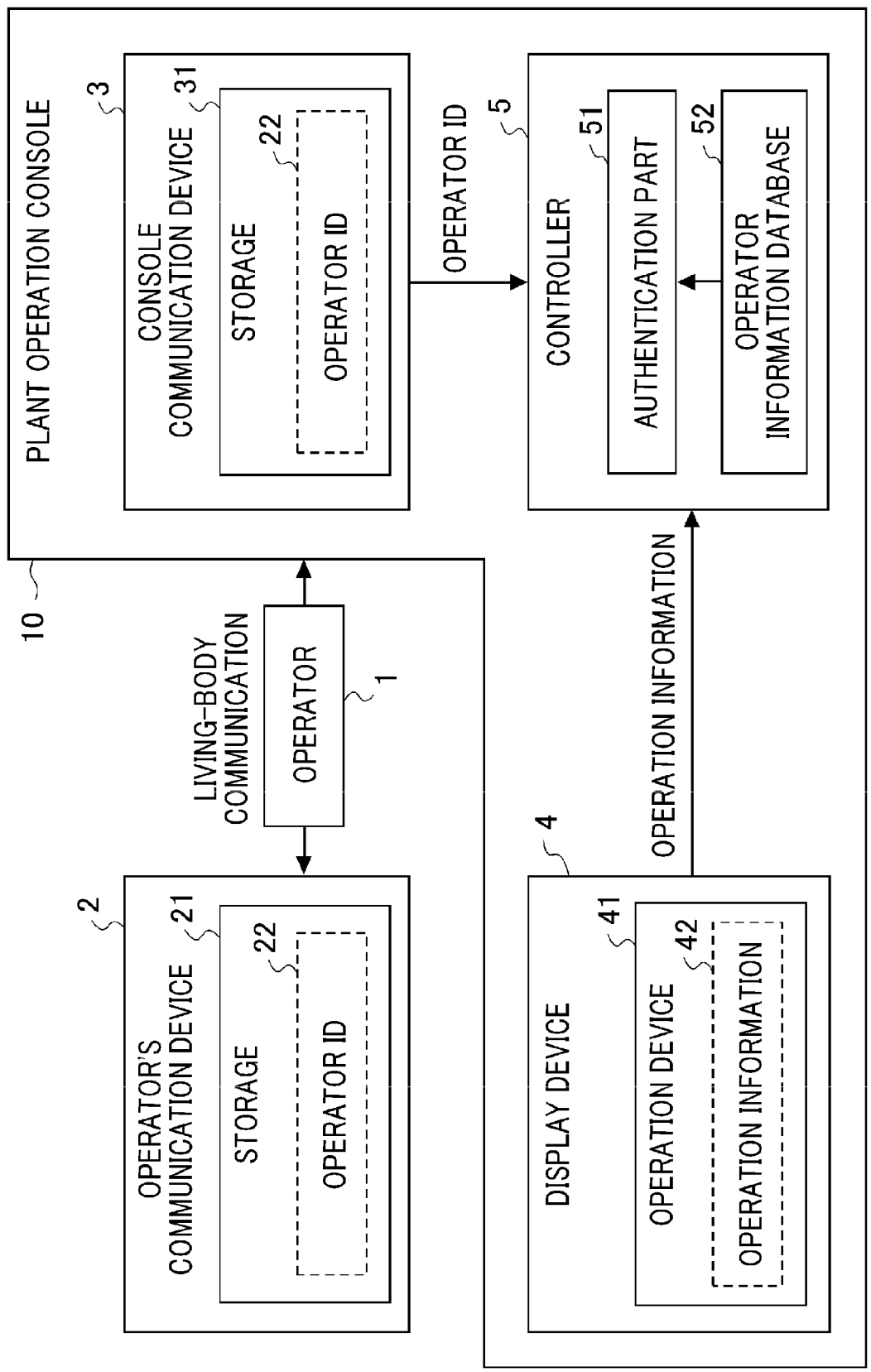
FIG. 1 shows an overall configuration of a plant operation apparatus in accordance with a first embodiment of the invention.

A plant operation apparatus in accordance with a first embodiment of the invention is described below with reference to the drawings. FIG. 1 shows an overall configuration of the plant operation apparatus in accordance with the first embodiment. The plant operation apparatus in accordance with the first embodiment includes an operator's communication device 2 as a mobile communication unit carried by an operator 1 and a plant operation console 10 (hereinafter abbreviated as console 10) on which the operator 1 operate the apparatus.

The operator's communication device 2 includes a storage 21 for storing an operator ID 22 for identifying the operator 1. Each operator 1 carries the operator's communication device 2 storing his/her own operator ID. The console 10 includes a console communication device 3 as an apparatus-side communication unit. The console communication device 3 performs living-body communication with the operator's communication device 2 through the operator 1.

A touch-screen display device 4 (abbreviated as display device 4 in FIG. 1) includes an operation device 41 as an input unit to which an operation relating to a plant operation is input. The touch-screen display device 4 includes a unit (not shown) that temporarily stores operation information 42 that is information of the operation input to the operation device 41 until the apparatus responses. A controller 5 includes: an authentication part 51 as an authentication unit that authenticates the operator 1; and an operator information database 52 for storing operator information.

Figure 2:
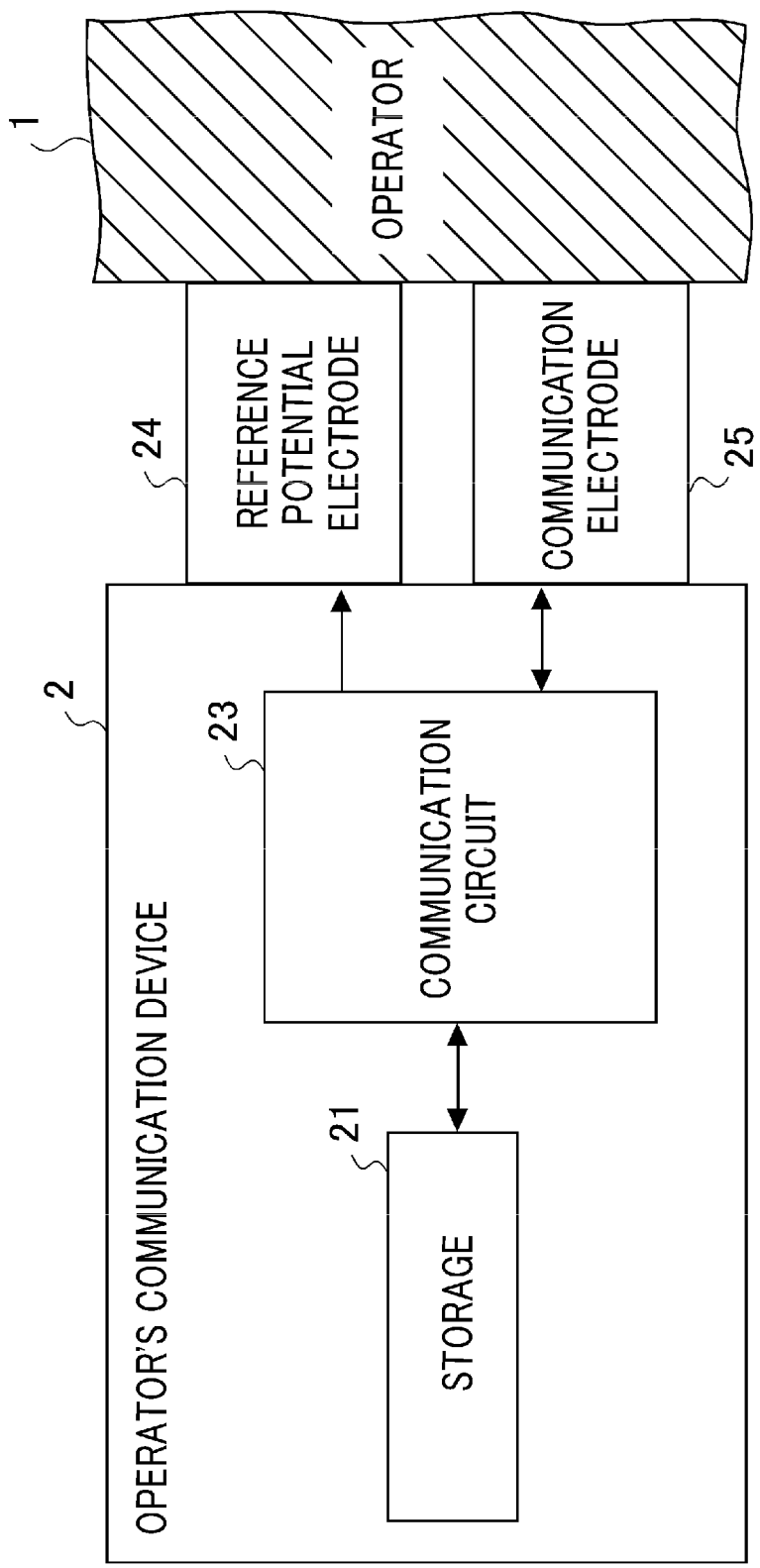
FIG. 2 shows a configuration of an operator's communication device of the plant operation apparatus in accordance with the first embodiment of the invention.
Figure 3:
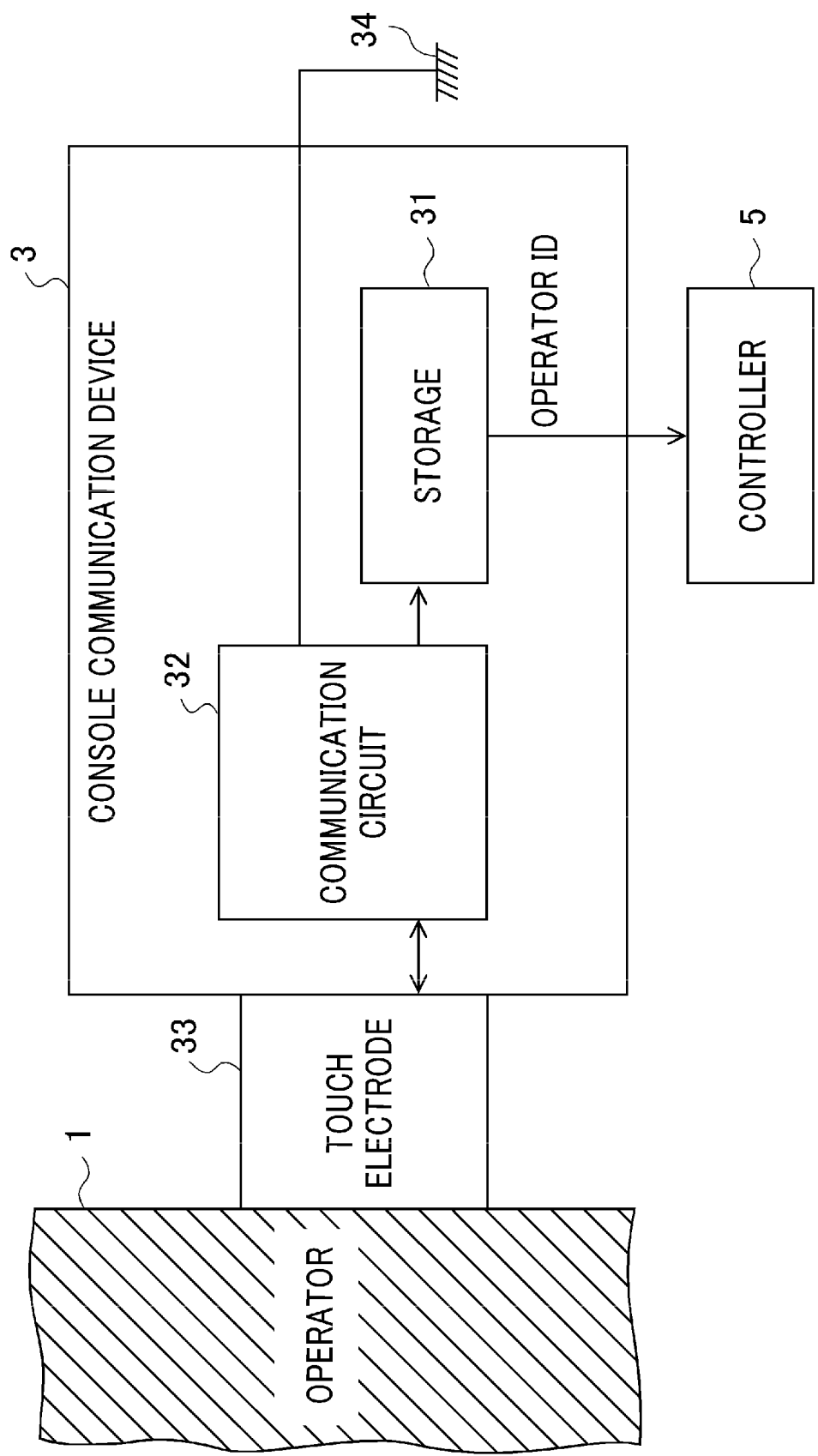
FIG. 3 shows a configuration of a console communication device of the plant operation apparatus in accordance with the first embodiment of the invention.

Next, a configuration and operation of the operator's communication device 2 and the console communication device 3 is described with reference to FIGS. 2 and 3. In FIGS. 2 and 3, the same part as that of FIG. 1 is denoted by the same reference numeral. As shown in FIG. 2, the operator's communication device 2 includes the storage 21, a communication circuit 23, a reference potential electrode 24 and a communication electrode 25. The storage 21 stores the operator ID 22 that is unique information for identifying the operator 1.

As shown in FIG. 3, the console communication device 3 includes a storage 31, a communication circuit 32, a touch electrode 33 and a ground part 34. When the operator 1 touches the touch electrode 33, continuity is provided between the touch electrode 33 and the communication electrode 25 of the operator's communication device 2 through the body of the operator 1.

At this time, an electric circuit of living-body communication is formed of: a route from the communication electrode 25 of the operator's communication device 2 through the operator 1 to the touch electrode 33 of the console communication device 3; and a route from the reference potential electrode 24 of the operator's communication device 2 through a ground to the ground part 34 of the console communication device 3. This electric circuit enables the communication circuit 32 of the console communication device 3 to communicate with the communication circuit 23 of the operator's communication device 2. The communication circuit 32 reads the operator ID 22 stored in the storage 21 of the operator's communication device 2 and temporarily stores the read operator ID 22 in the storage 31.

It should be noted that the operator's communication device 2 has a form that only needs to be such that, when worn by the operator, the reference potential electrode 24 and the communication electrode 25 are always in touch with the operator 1, and is not limited to any particular form. For example, the operator's communication device 2 may be wristwatch-type, card-type like employee ID card or mobile phone-type. Also, in order to perform living-body communication, the operator 1 may touch the touch electrode 33 with any body part which is not limited to a hand.

Figure 4:
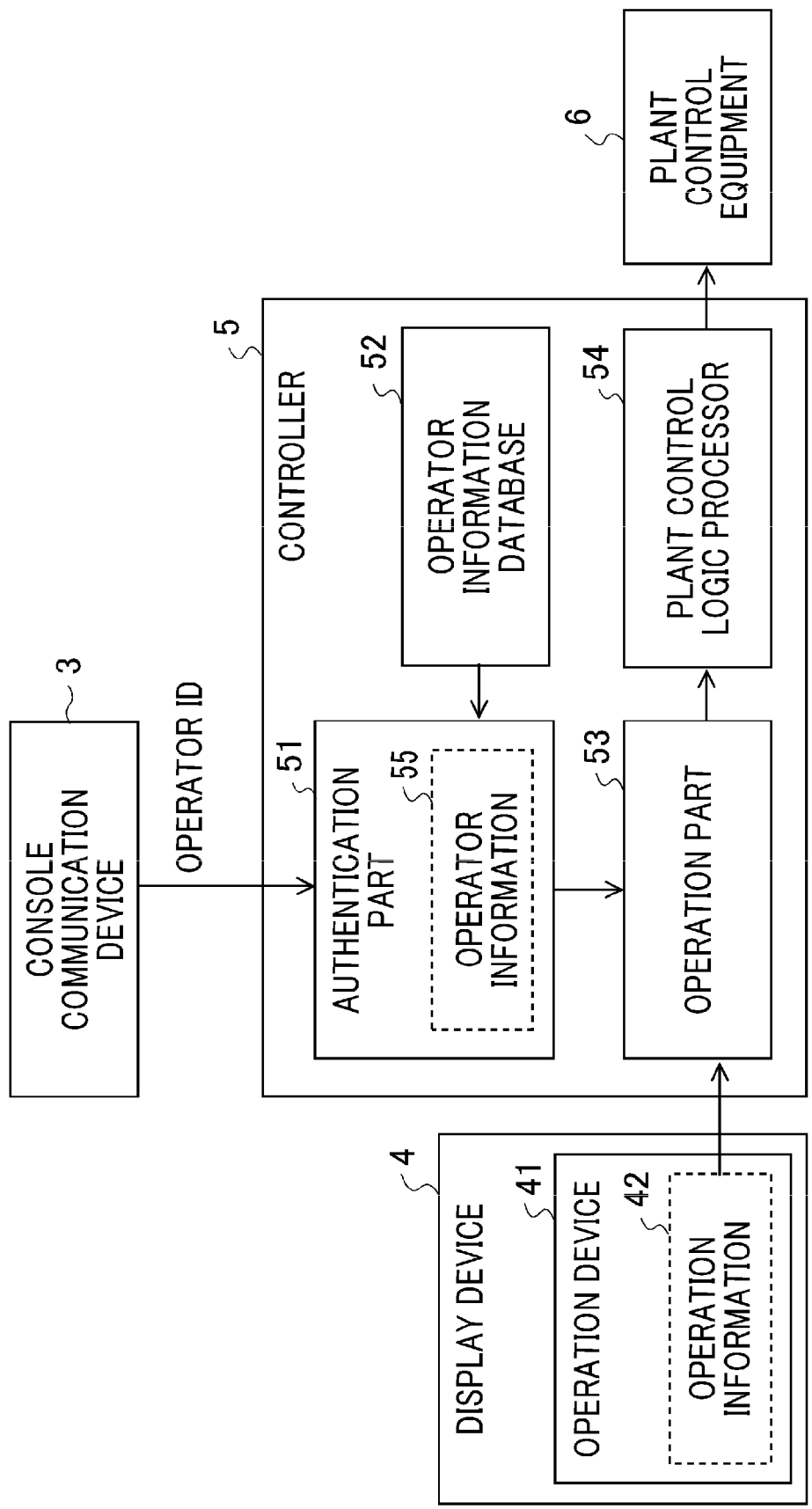
FIG. 4 shows a configuration of a controller of the plant operation apparatus in accordance with the first embodiment of the invention.

Next, a configuration and operation of the controller 5 is described with reference to FIG. 4. In FIG. 4, the same part as that of FIG. 1 is denoted by the same reference numeral. The controller 5 includes the authentication part 51, the operator information database 52, an operation part 53 as an operation unit and a plant control logic processor 54. The authentication part 51 reads the operator ID 22 stored in the storage 31 of the console communication device 3 and authenticates the operator 1.

Now, authentication is described. The authentication part 51 checks the operator ID 22 obtained from the console communication device 3 against the operator information database 52 and obtains operator information 55 including the checked operator ID 22. Based on this operator information 55, the authentication part 51 determines whether or not the operator 1 currently in touch with the touch electrode 33 is an operator 1 who is qualified to operate the apparatus. If it is determined that the operator 1 is qualified to operate the apparatus, the authentication part 51 authenticates and permits the operator 1 to operate the operation device 41 (i.e., authentication has succeeded).

It should be noted that the authentication part 51 performs the above-described authentication when the operator 1 in touch with the touch electrode 33 inputs an operation to the operation device 41. Furthermore, the authentication part records authentication information including the authentication time, the operator ID and the authentication result in a storage unit (not shown) in the controller 5.

The operation part 53 obtains the authentication result from the authentication part 51, then, while the operator 1 authenticated by the authentication part 51 is in touch with the touch electrode 33, performs an operation input to the operation device 41 by the authenticated operator 1. Specifically, the operation part 53 transmits to the plant control logic processor 54 an operation command for plant control equipment 6 based on the operation information 42 obtained from the operation device 41. Based on the operation command, the plant control logic processor 54 performs control logic processing to cause the plant control equipment 6 to work.

Figure 5:
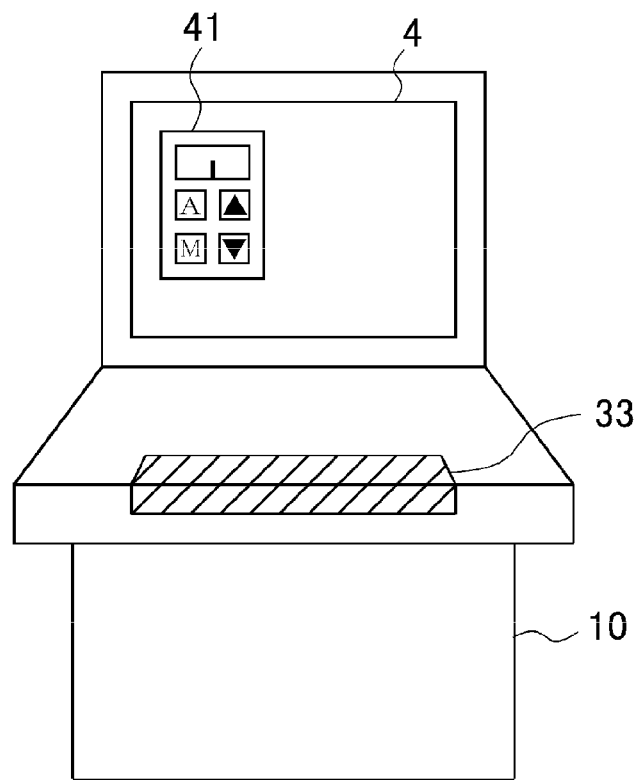
FIG. 5 is a front view of a plant operation console in accordance with the first embodiment of the invention.
Figure 6:
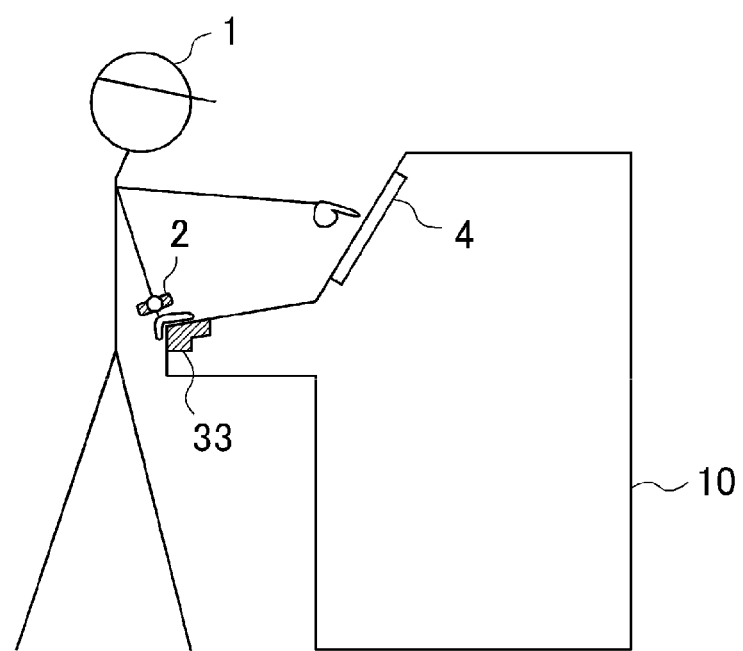
FIG. 6 is a side view of the plant operation console in accordance with the first embodiment of the invention.

FIG. 5 is a front view of the operation console 10 of the plant operation apparatus in accordance with the first embodiment. FIG. 6 is a side view of the operation console 10. As shown in FIG. 5, the touch-screen display device 4 and the touch electrode 33 of the console communication device 3 are placed on the front side of the operation console 10. On the screen of the touch-screen display device 4, a touch panel as the operation device 41 is displayed. The operator 1 touches the operation device 41 to input an operation relating to plant operation.

As shown in FIG. 6, the operator 1 carrying the operator's communication device 2 and in touch with the touch electrode 33 should input an operation to the operation device 41 on the screen of the touch-screen display device 4. This provides electric continuity between the communication electrode 25 of the operator's communication device 2 and the touch electrode 33 of the console communication device 3 through the body of the operator 1. In this state, when the operator 1 inputs an operation to the operation device 41, the operator 1 is promptly and instantaneously authenticated. Then, if authentication has succeeded, the input to the operation device 41 is accepted.

Next, FIGS. 7 and 8 show a data configuration example of the operator information database 52 in which data necessary for authenticating the operator 1 is recorded. FIG. 7 shows the operator information database 52 that includes an operator ID, an operator name and a qualification for operation. In the item of the qualification for operation, whether or not the operator is qualified to operate the plant operation apparatus is recorded.

FIG. 8 shows an operator information database 52a that includes an operator ID, an operator name, an operation device, and a qualification for operation. In the item of the qualification for operation, the detail of the qualification for operation is recorded for each operator. In addition to the items shown in FIGS. 7 and 8, the operator information database 52 may include an item, such as the department, birth date and registration date of the operator.

Figure 9:
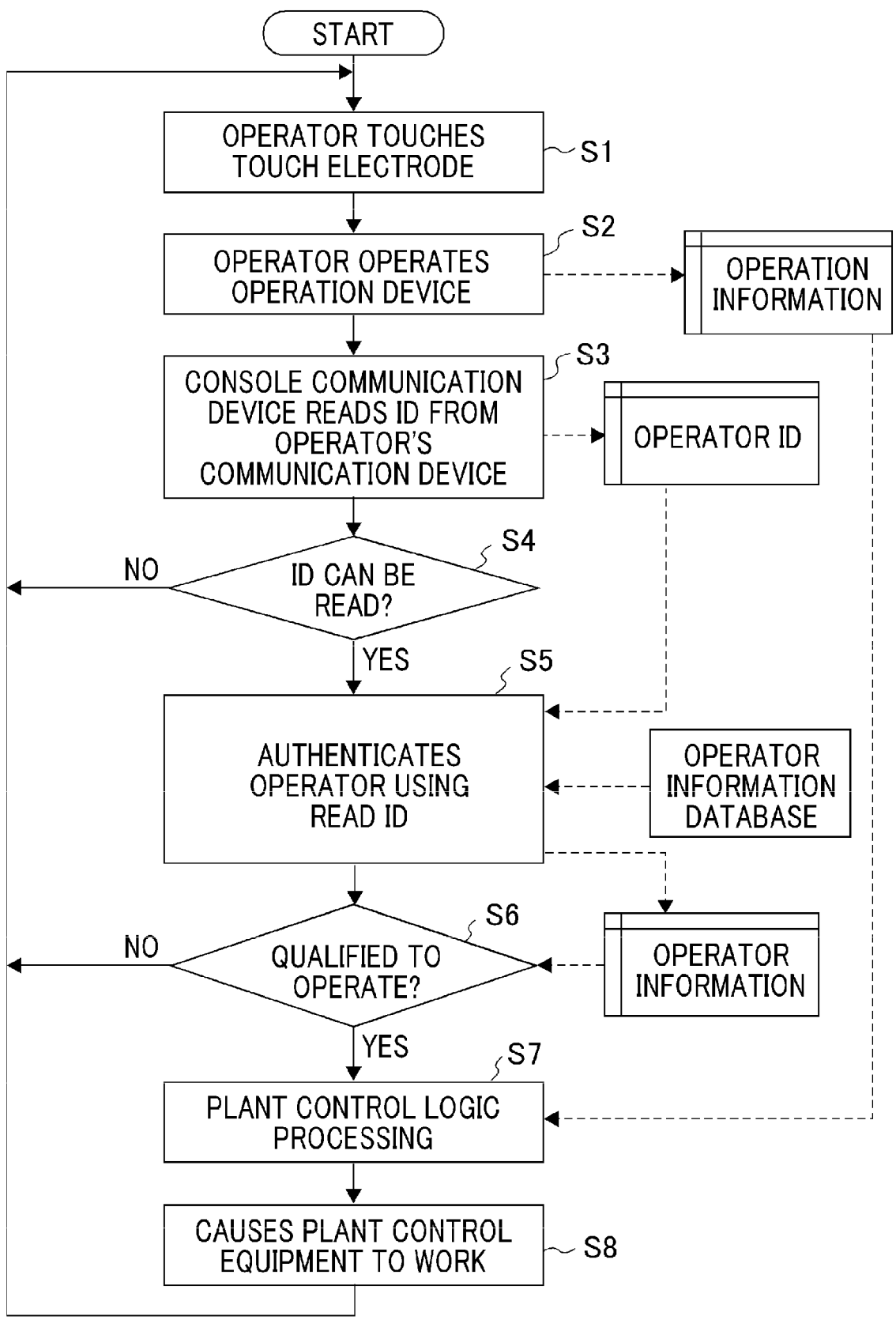
FIG. 9 is a flowchart showing an authentication process of the plant operation apparatus in accordance with the first embodiment of the invention.

An authentication process of the plant operation apparatus in accordance with the first embodiment is described with reference to a flowchart shown in FIG. 9. First, in step 1 (S1), the operator 1 carrying the operator's communication device 2 touches the touch electrode 33. Next, a processing of step 2 (S2) is performed while the operator 1 is in touch with the touch electrode 33. In S2, the operator 1 operates the operation device 41 displayed on the touch-screen display device 4. At this point, the operation part 53 of the controller 5 obtains the operation information 42 from the operation device 41.

Next, in step 3 (S3), the console communication device 3 reads the operator ID 22 from the storage 21 of the operator's communication device 2 and temporarily stores the read operator ID 22 in the storage 31. Next, in step 4 (S4), the authentication part 51 determines whether the operator ID 22 can be read or not. If it is determined that the operator ID 22 has been correctly read from the storage 31 of the console communication device 3 (YES), the process proceeds to step 5 (S5).

In S5, the authentication part 51 checks the operator ID 22 read from the storage 31 of the console communication device 3 against the operator information database 52 and performs authentication. At this point, the authentication part 51 obtains operator information 55 including the checked operator ID 22 from the operator information database 52.

Next, in step 6 (S6), the authentication part 51 determines from the operator information 55 obtained in S5 whether or not the operator 1 is qualified to operate the apparatus. If it is determined that the operator 1 is qualified to operate the apparatus (YES), the authentication part 51 authenticates the operator 1. It should be noted that, at this point, the authentication part 51 records authentication information including the authentication time, the operator ID 22 and the authentication result in the storage unit in the controller 5. The operation part 53 is notified by the authentication part 51 that authentication has succeeded.

Next, in step 7 (S7), the plant control logic processor 54 obtains an operation command from the operation part 53 and performs plant control logic processing. Next, in step 8 (S8), based on the result of processing by the plant control logic processor 54, the plant control logic processor 54 causes the plant control equipment 6 to work.

On the other hand, if it is determined in S4 that the operator ID 22 is not correctly read (NO) or if it is determined in S6 that the operator 1 is not qualified to operate the apparatus (NO), it is determined that authentication has failed (authentication is not allowed). Then, the process returns to S1 and waits until a next operator 1 touches the touch electrode 33 and operates the operation device 41 in S2.

As described above, according to the plant operation apparatus in accordance with the first embodiment, when the operator 1 carrying the operator's communication device 2 simply touches the touch electrode 33 of the console communication device 3, authentication is promptly and instantaneously performed. So, authentication can be performed in away that does not increase the workload for the operator 1 and obstruct emergency operation.

Furthermore, even when plural operators 1 operate the apparatus in relays, authentication is promptly and instantaneously performed for each of the operators 1, which can prevent an operator 1 who is not qualified from operating the apparatus. Furthermore, since the result of authentication by the authentication part 51 is recorded, when a plant anomaly occurred, the operator who operated the apparatus at that time can be identified.

Second Embodiment

A plant operation apparatus in accordance with a second embodiment of the invention has an overall configuration similar to that of the first embodiment (see FIG. 1). In the plant operation apparatus in accordance with the first embodiment, the operator 1 who operated the apparatus is identified by authentication information including the authentication time, the operator ID and the authentication result recorded by the authentication part 51. Additionally, in the second embodiment, the operator information 55 of an operator 1 who operated the apparatus is recorded in relation to an operation history in order to identify which operator 1 performed what operation.

Figure 10:
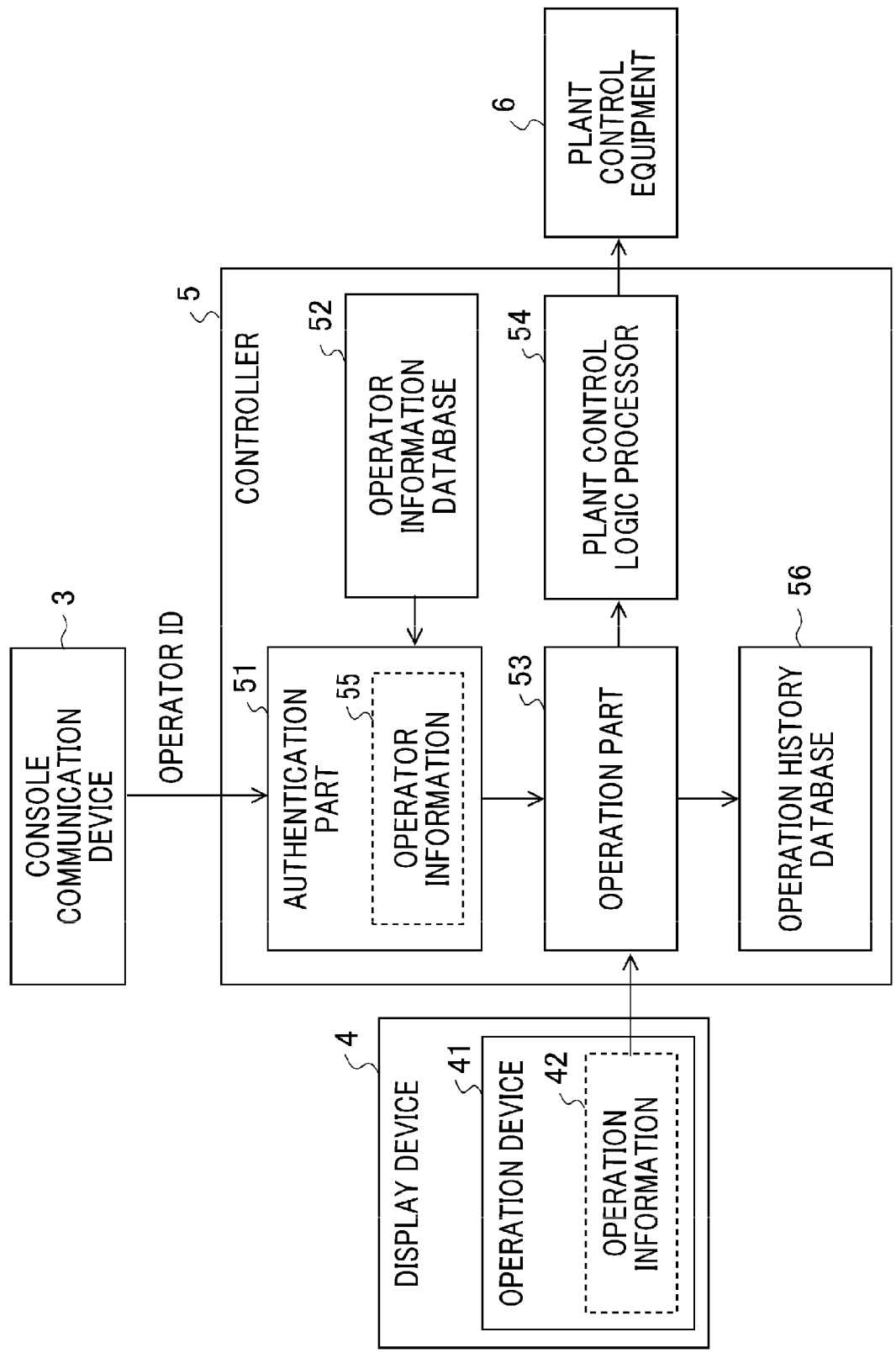
FIG. 10 shows a configuration of a controller of a plant operation apparatus in accordance with a second embodiment of the invention.

FIG. 10 shows a configuration of a controller of the plant operation apparatus in accordance with the second embodiment. In FIG. 10, the same part as that of FIG. 4 is denoted by the same reference numeral. A controller 5 includes an authentication part 51, an operator information database 52, an operation part 53, a plant control logic processor 54 and an operation history database 56.

The operation part 53 obtains operator information 55 of an operator 1 authenticated by the authentication part 51, and records an operation history of an operation input to an operation device 41 by the operator 1 in the operation history database 56 in relation to the operator information 55.

FIG. 11 shows a data configuration example of the operation history database 56. The operation history database 56 is a database for storing the operation history and includes an operation date and time, equipment name, operation detail and result, and operator name. Although the data configuration of the operation history database 56 is not limited to this, either the operator ID or operator name for identifying the operator 1 who operated the apparatus is required in any configuration.

Figure 12:
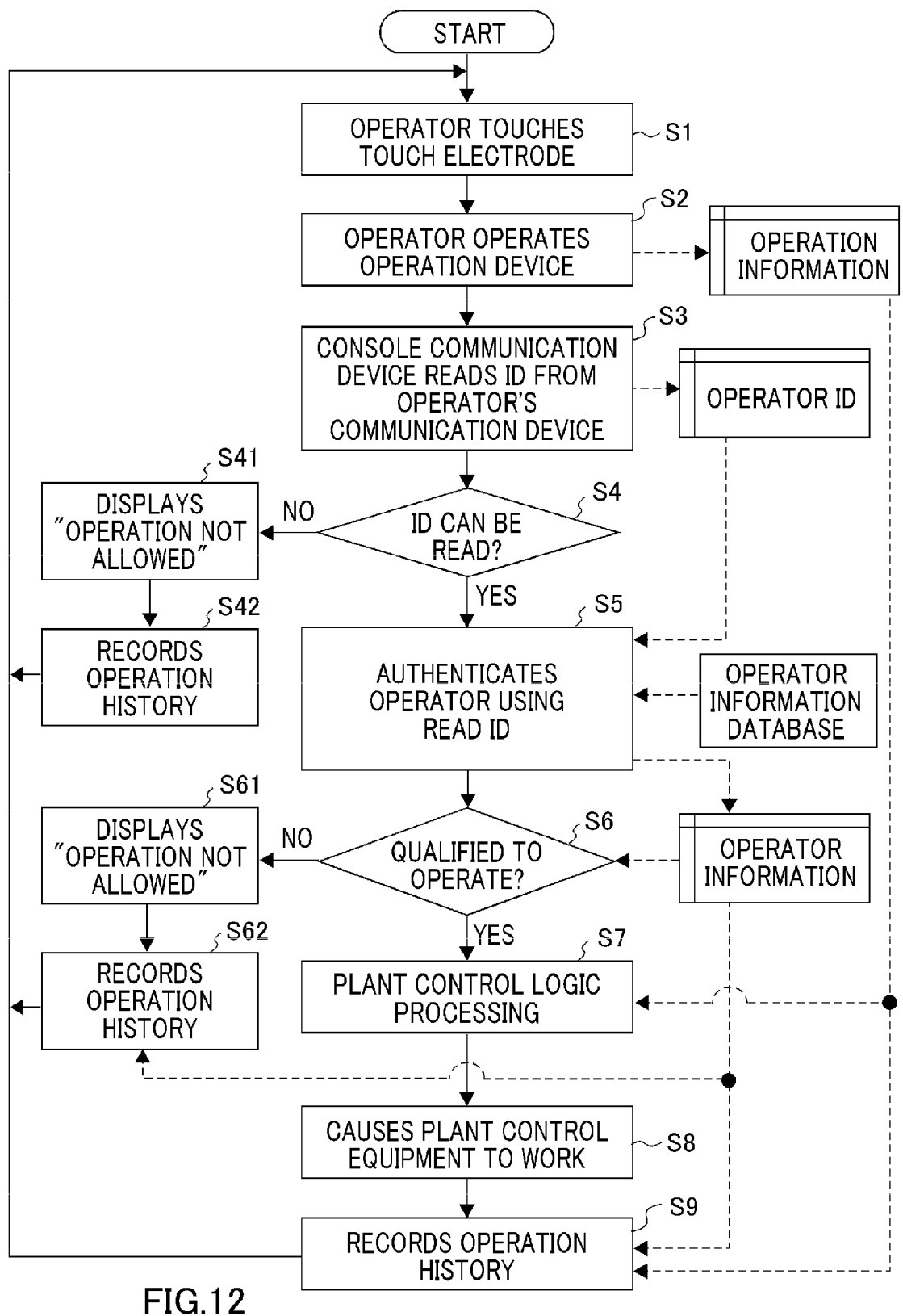
FIG. 12 is a flowchart showing a process of authentication and operation history recording of the plant operation apparatus in accordance with the second embodiment of the invention.

FIG. 12 is a flowchart showing a process of authentication and operation history recording of the plant operation apparatus in accordance with the second embodiment. Since authentication steps S1 to S8 in FIG. 12 is the same as those in the first embodiment, the description will not be repeated (see FIG. 9). Now, operation history recording is described. If it is determined in S4 that the operator ID 22 is not correctly read (NO), the process proceeds to step 41 (S41).

In S41, the operation part 53 displays a message "OPERATION NOT ALLOWED" on the touch-screen display device 4. Furthermore, in step 42 (S42), the operation part 53 records in the operation history database 56 that the operation is not allowed, then the process returns to S1.

If it is determined in S6 that the operator 1 is not qualified to operate the apparatus (NO), the process proceeds to step 61 (S61). In S61, the operation part 53 displays a message "OPERATION NOT ALLOWED" on the touch-screen display device 4. Furthermore, in step 62 (S62), the operation part 53 records in the operation history database 56 that the operation is not allowed, then the process returns to S1.

In S8, the operation part 53 causes the plant control equipment 6 to work, then in step 9 (S9), the operation part 53 records a history of the operation performed in S8 in the operation history database 56 in relation to the operator information 55.

As described above, according to the plant operation apparatus in accordance with the second embodiment, in addition to the same effect as that of the first embodiment, the operation history is recorded in the operation history database 56 in relation to the operator information 55, which allows the operator 1 who operated the apparatus and its operation history to be easily identified. This enables prompt investigation into the cause of a plant anomaly when it occurs.

Third Embodiment

Figure 13:
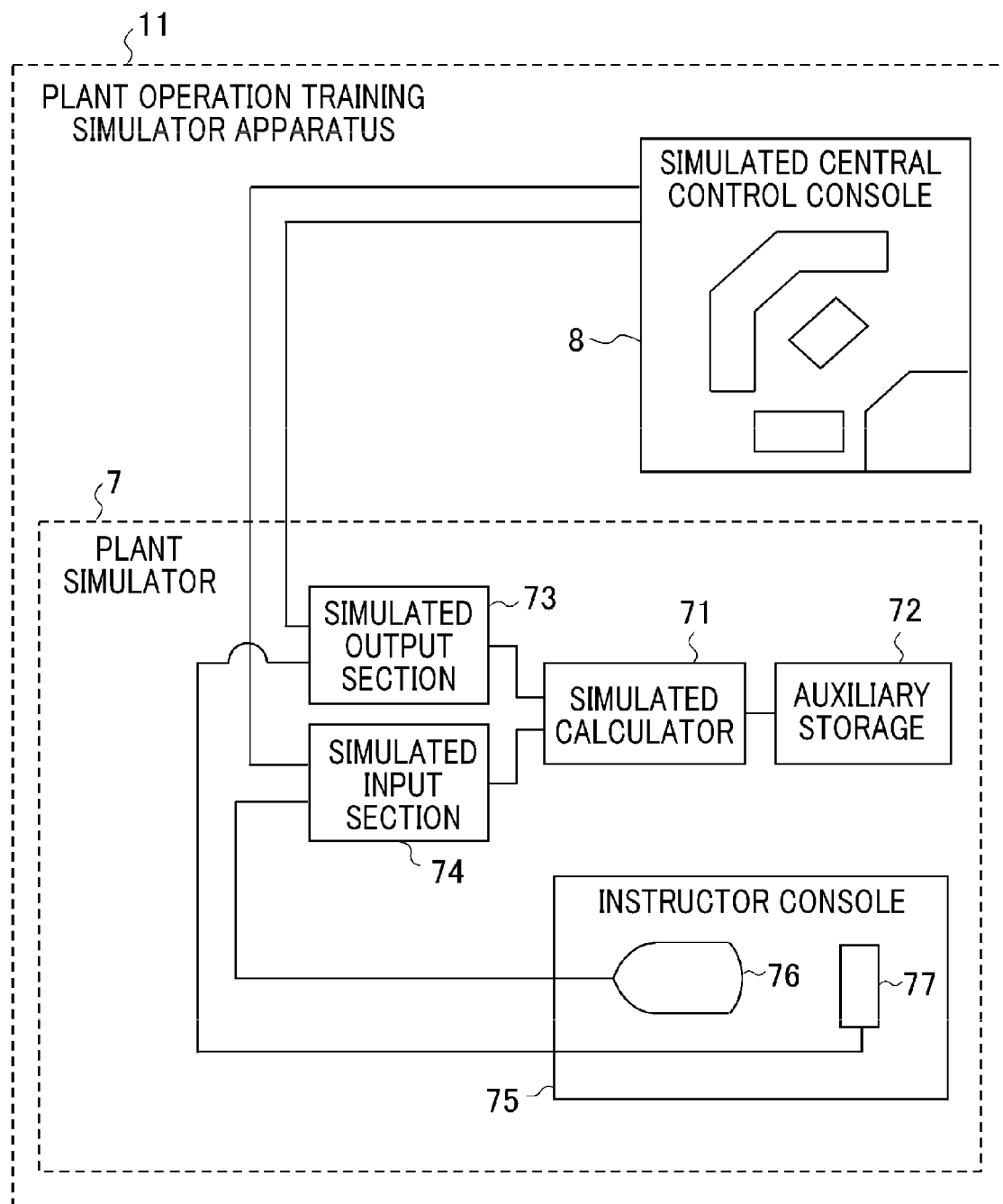
FIG. 13 shows an overall configuration of a plant operation training simulator apparatus in accordance with a third embodiment of the invention.

A plant operation training simulator apparatus in accordance with a third embodiment of the invention is described below with reference to the drawings. FIG. 13 shows an overall configuration of the plant operation training simulator apparatus in accordance with the third embodiment. A plant operation training simulator apparatus 11 includes: a plant simulator 7 for performing simulated calculation of the state of a real plant, such as a nuclear power plant; and a simulated central control console 8 for controlling the plant simulator 7.

The plant simulator 7 includes a simulated calculator 71, an auxiliary storage 72, a simulated output section 73, a simulated input section 74 and a instructor console 75. The simulated calculator 71 performs simulated calculation of a plant state signal based on a simulation model stored in the auxiliary storage 72. A result of the calculation is provided to the simulated central control console 8 through the simulated output section 73.

The instructor console 75 causes a plant anomaly event to occur in the plant simulator 7 and includes a display 76 and a operation device 77. For example, the anomaly event may be a turbine trip, a nuclear reactor trip, a device failure or the like. An instructor monitors the current simulation state of the plant simulator 7 through the plant state signal and accordingly sets an anomaly event from the instructor console 75. The simulated calculator 71 performs simulated calculation based on the setting of the input anomaly event.

Under the guidance of the instructor, a trainee operates the simulated central control console 8 to operate the plant simulator 7. The operation performed in the simulated central control console 8 is input to the simulated calculator 71 through the simulated input section 74. The simulated calculator 71 further performs simulated calculation based on the input operation information.

Figure 14:
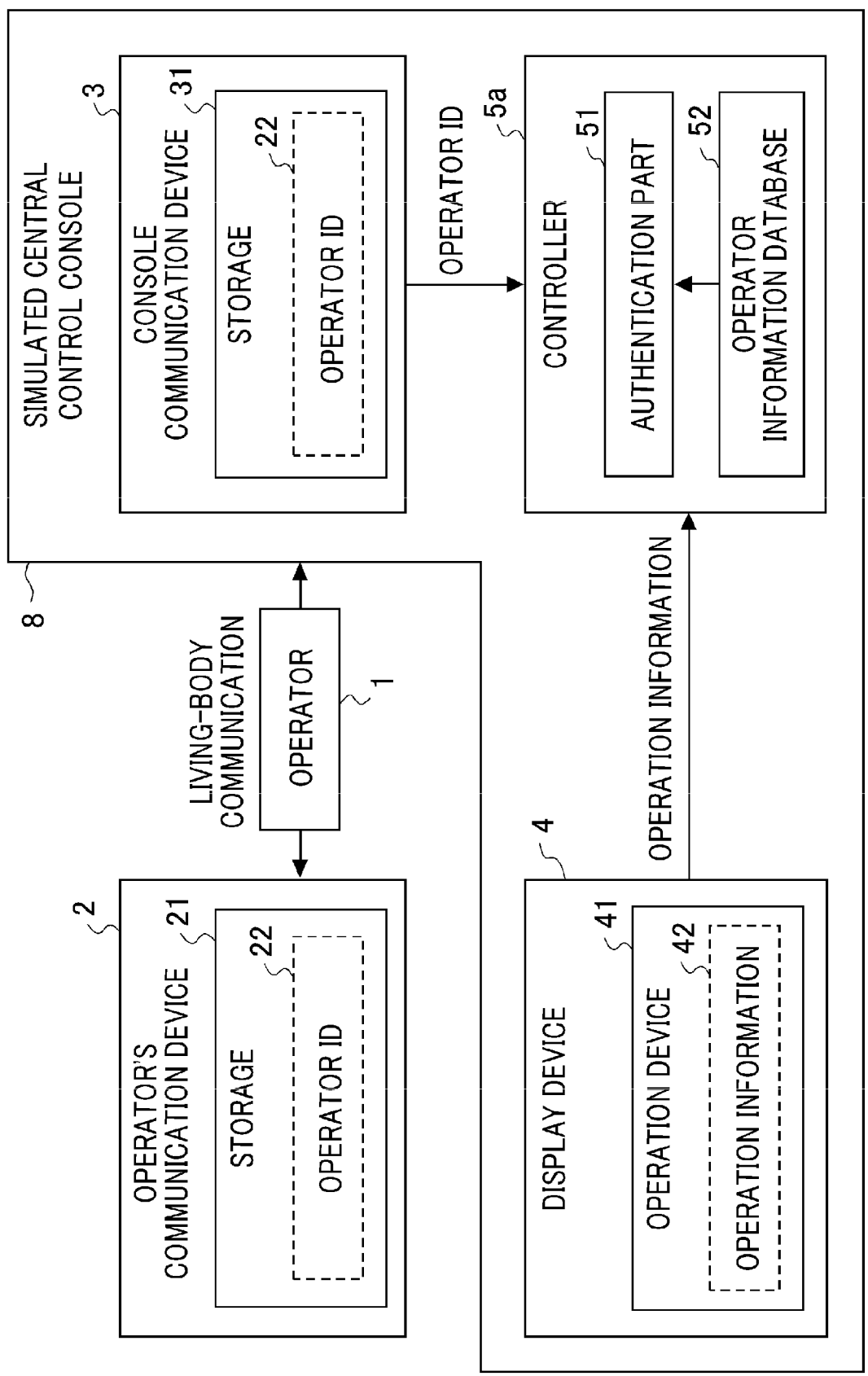
FIG. 14 shows a configuration of a simulated central control console of the plant operation training simulator apparatus in accordance with the third embodiment of the invention.

Next, a configuration of the simulated central control console 8 is described with reference to FIG. 14. In FIG. 14, the same part as that of FIG. 1 or a part corresponding to that of FIG. 1 is denoted by the same reference numeral. A operator 1 (including a trainee) who operates the simulated central control console 8 carries an operator's communication device as a mobile communication unit. The operator's communication device 2 includes a storage 21 for storing an operator ID 22 for identifying the operator 1. Each operator 1 carries the operator's communication device 2 storing his/her own operator ID. The simulated central control console 8 includes a console communication device 3 as a first apparatus-side communication unit.

A display device 4 of the simulated central control console 8 includes an operation device 41 as an input unit that inputs an operation for the plant simulator 7. The operation device 41 is a touch panel displayed on the screen. The operator 1 touches the operation device 41 to input an operation. A controller 5a includes: an authentication part 51 as a first authentication unit that authenticates the operator 1; and an operator information database 52 for storing operator information.

Next, a configuration and operation of the operator's communication device 2 and the console communication device 3 is described. Since the configuration and operation of the operator's communication device 2 and the console communication device 3 in accordance with the third embodiment is similar to that of the plant operation apparatus in accordance with the first embodiment, the configuration and operation is described with reference to FIGS. 2 and 3. As shown in FIG. 2, the operator's communication device 2 includes the storage 21, a communication circuit 23, a reference potential electrode 24 and a communication electrode 25. The storage 21 stores the operator ID 22 that is unique information for identifying the operator 1.

As shown in FIG. 3, the console communication device 3 includes a storage 31, a communication circuit 32, a touch electrode 33 as a first touch electrode and a ground part 34. When the operator 1 touches the touch electrode 33, continuity is provided between the touch electrode 33 and the communication electrode 25 of the operator's communication device 2 through the body of the operator 1.

At this time, an electric circuit of living-body communication is formed of: a route from the communication electrode 25 of the operator's communication device 2 through the operator 1 to the touch electrode 33 of the console communication device 3; and a route from the reference potential electrode 24 of the operator's communication device 2 through a ground to the ground part 34 of the console communication device 3. This electric circuit enables the communication circuit 32 of the console communication device 3 to communicate with the communication circuit 23 of the operator's communication device 2. The communication circuit 32 reads the operator ID 22 stored in the storage 21 of the operator's communication device 2 and temporarily stores the read operator ID 22 in the storage 31.

Figure 15:
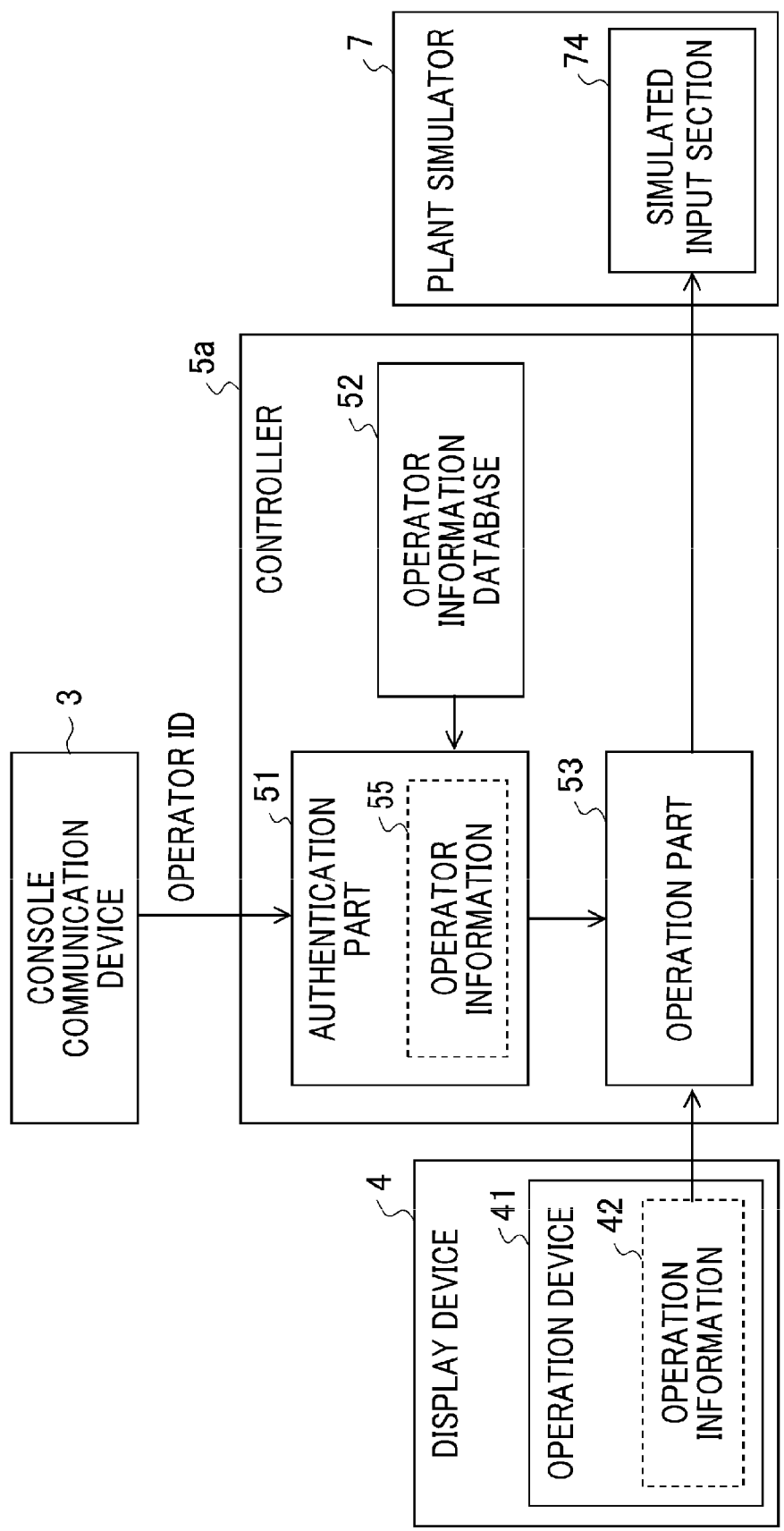
FIG. 15 shows a configuration of a controller of the plant operation training simulator apparatus in accordance with the third embodiment of the invention.

Next, a configuration and operation of the controller 5a is described with reference to FIG. 15. In FIG. 15, the same part as that of FIG. 14 is denoted by the same reference numeral. The controller 5a includes the authentication part 51, the operator information database 52, an operation part 53 as an operation unit and an operation history database (not shown). The authentication part 51 reads the operator ID 22 stored in the storage 31 of the console communication device 3 and authenticates the operator 1.

Now, authentication is described. The authentication part 51 checks the operator ID 22 obtained from the console communication device 3 against the operator information database 52 and obtains operator information 55 including the checked operator ID 22. In the simulated central control console 8 of the plant operation training simulator apparatus 11, the operator 1 may be a trainee who is not qualified to operate the apparatus. Thus, the authentication part 51 checks the operator ID 22 obtained from the console communication device 3 against the operator information database 52 and determines whether or not the operator currently in touch with the touch electrode 33 is an operator 1 registered in the operator information database 52.

If it is determined that the operator 1 is a registered operator 1, the authentication part 51 authenticates and permits the operator 1 to operate the operation device 41 (i.e., authentication has succeeded). It should be noted that the authentication part 51 performs the above-described authentication when the operator 1 in touch with the touch electrode 33 inputs an operation to the operation device 41. Furthermore, the authentication part 51 records authentication information including the authentication time, the operator ID and the authentication result in a storage unit (not shown) in the controller 5a.

The operation part 53 obtains the authentication result from the authentication part 51, then, while the operator 1 authenticated by the authentication part 51 is in touch with the touch electrode 33, performs simulated calculation by the plant simulator 7 based on an operation input to the operation device 41 by the authenticated operator 1. Specifically, an operation command based on the operation input to the operation device 41 is transmitted to the simulated input section 74 of the plant simulator 7.

Furthermore, the operation part 53 obtains operator information 55 of the operator 1 authenticated by the authentication part 51, and records an operation history of the operation input to the operation device 41 by the operator 1 in the operation history database in relation to the operator information 55.

As described above, according to the plant operation training simulator apparatus 11 in accordance with the third embodiment, when the operator 1 carrying the operator's communication device 2 simply touches the touch electrode 33 of the console communication device 3, authentication is promptly and instantaneously performed. So, authentication can be performed in a way that does not increase the workload for the operator 1 and obstruct emergency operation.

Furthermore, even when plural operators 1 operate the apparatus in relays, authentication is promptly and instantaneously performed for each of the operators 1 and the authentication result is recorded, which allows identifying the operator 1 who operated the apparatus. Furthermore, the operation history is recorded in the operation history database in relation to the operator information 55, which allows the operator 1 who operated the apparatus and its operation history to be easily identified. Accordingly, when the plant operation training simulator apparatus 11 in accordance with the third embodiment is used for a skill test for plant operator qualification, the test result can be correctly evaluated.

Fourth Embodiment

In the third embodiment, authentication using living-body communication is applied to the simulated central control console 8 of the plant operation training simulator apparatus 11. In a fourth embodiment of the invention, authentication using living-body communication is further applied to the instructor console 75 of the plant simulator 7, which intends to prevent an operator 1 other than a registered instructor from operating the instructor console 75. Since the overall configuration of the plant operation training simulator apparatus 11 in accordance with the fourth embodiment is similar to that of the third embodiment, the description will not be repeated (see FIG. 13).

Figure 16:
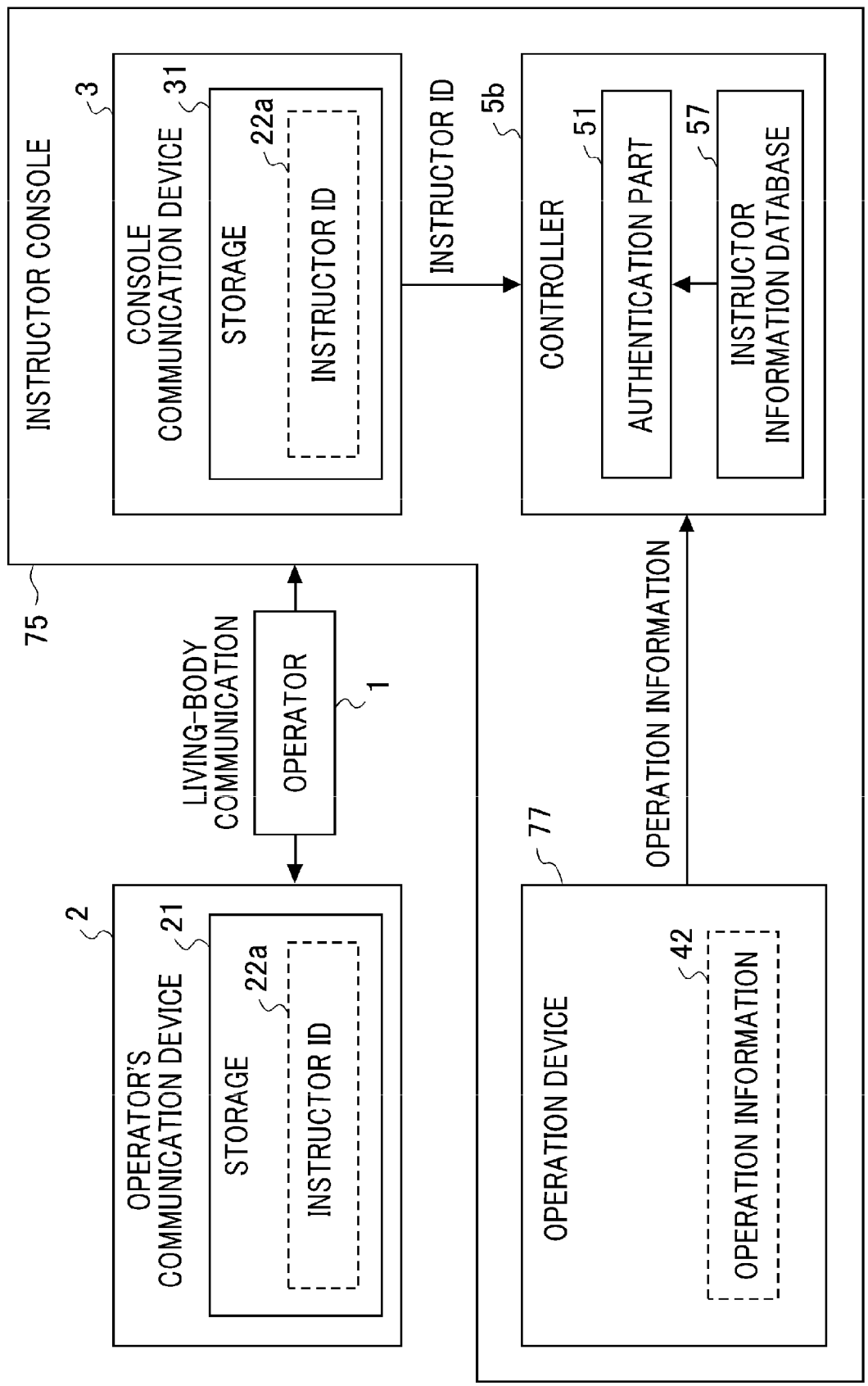
FIG. 16 shows a configuration of an instructor console of the plant operation training simulator apparatus in accordance with a fourth embodiment of the invention.

FIG. 16 shows a configuration of the instructor console 75 of the plant operation training simulator apparatus 11 in accordance with the fourth embodiment. In FIG. 16, the same part as that of FIG. 14 or a part corresponding to that of FIG. 14 is denoted by the same reference numeral. A operator 1 (instructor) who operates the instructor console 75 carries an operator's communication device 2 as a mobile communication unit. The operator's communication device 2 includes a storage 21 that stores an instructor ID 22a for identifying an instructor. Since the configuration and operation of the operator's communication device 2 is similar to that of the third embodiment, the description will not be repeated.

As shown in FIG. 16, the instructor console 75 includes a console communication device 3 as a second apparatus-side communication unit, an operation device 77 and a controller 5b. The console communication device 3 includes a second touch electrode (not shown). When the operator 1 touches the second touch electrode, the console communication device 3 reads the instructor ID 22a from the operator's communication device 2 through living-body communication and temporarily stores the read instructor ID 22a in the storage 31. Since the rest of the configuration and operation of the console communication device 3 is similar to that of the third embodiment, the description will not be repeated.

Setting of an anomaly event for the plant simulator 7 is input to the operation device 77. The instructor carries an operator's communication device 2 storing his/her own instructor ID 22a, and, while touching the second touch electrode, inputs an operation to the operation device 77.

The controller 5b includes an authentication part 51 as a second authentication unit and an instructor information database 57. The authentication part 51 reads the instructor ID 22a from the storage 31 of the console communication device 3 and authenticates the operator 1.

Now, authentication is described. The authentication part 51 checks the instructor ID 22a obtained from the console communication device 3 against the instructor information database 57 to determine whether or not the operator 1 currently in touch with the second touch electrode is an instructor registered in the instructor information database 57. If it is determined that the operator 1 is a registered instructor 1, the authentication part 51 authenticates and permits the operator 1 to operate the operation device 77 (i.e., authentication has succeeded).

As described above, according to the fourth embodiment, in addition to the same effect as that of the third embodiment, it is possible to prevent an operator 1 other than a registered instructor from operating the instructor console 75.

It should be noted that embodiments of the invention can be freely combined and appropriately modified or omitted within the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. A plant operation apparatus comprising:
a mobile communication unit that is carried by an operator and stores an operator ID for identifying the operator;
an apparatus-side communication unit that has a touch electrode for reading the operator ID from the mobile communication unit through living-body communication;
an authentication unit that obtains the operator ID from the apparatus-side communication unit to authenticate the operator;
an input unit to which an operation relating to a plant operation of the plant operation apparatus is input by the operator; and
an operation unit that performs the plant operation by the plant operation apparatus based on the operation input to the input unit by the operator,
wherein the apparatus-side communication unit becomes able to read the operator ID stored in the mobile communication unit when continuity is provided between the touch electrode and an electrode of the mobile communication unit through the body of the operator in contact with the touch electrode, wherein the authentication unit checks the operator ID obtained from the apparatus-side communication unit against an operator information database and, based on operator information including the checked operator ID, performs authentication and records the authentication result, and wherein the operation unit obtains the authentication result from the authentication unit, then, while the operator authenticated by the authentication unit is in contact with the touch electrode, performs by the plant operation apparatus the operation input to the input unit by the authenticated operator.

2. The plant operation apparatus according to claim 1, wherein the authentication unit performs authentication when the operator in contact with the touch electrode inputs an operation to the input unit.

3. The plant operation apparatus according to claim 1, wherein the operation unit obtains the operation information of the operator from the authentication unit and records a history of the operation input to the input unit by the operator in an operation history database in relation to the operator information.

4. The plant operation apparatus according to claim 1, wherein the input unit is a touch panel displayed on the screen of a display device.

5. The plant operation apparatus according to claim 1, wherein the authentication unit determines whether the operator that is currently in contact with the touch electrode is an operator who is qualified to operate an apparatus performing the inputted operation.

6. The plant operation apparatus according to claim 1, wherein the authentication unit records a time of the authentication and the operator ID.

7. The plant operation apparatus according to claim 1, wherein the operator information database stores authentication data used for authenticating the operator, the authentication data includes at least one operator ID, at least one operator name, and at least qualification for operation that indicates if a corresponding operator is qualified to operate the plant operation apparatus.

8. A plant operation training simulator apparatus comprising:
a mobile communication unit that is carried by an operator and stores an operator ID for identifying the operator;
a first apparatus-side communication unit that has a first touch electrode for reading the operator ID from the mobile communication unit through living-body communication;
a first authentication unit that obtains the operator ID from the first apparatus-side communication unit to authenticate the operator;

an input unit to which an operation relating to an operation of a plant is input by the operator for a plant simulator for performing simulated calculation of the state of the plant; and an operation unit that performs the simulated calculation by the plant simulator based on the operation input to the input unit by the operator, wherein the first apparatus-side communication unit becomes able to read the operator ID stored in the mobile communication unit when continuity is provided between the first touch electrode and an electrode of the mobile communication unit through the body of the operator in contact with the first touch electrode, wherein the first authentication unit checks the operator ID obtained from the first apparatus-side communication unit against an operator information database and, based on operator information including the checked operator ID, performs authentication and records the authentication result, and wherein the operation unit obtains the authentication result from the first authentication unit, then, while the operator authenticated by the authentication unit is in contact with the first touch electrode, performs the simulated calculation based on the operation input to the input unit by the authenticated operator.

9. The plant operation training simulator apparatus according to claim 8, wherein the first authentication unit performs authentication when the operator in contact with the first touch electrode inputs an operation to the input unit.

10. The plant operation training simulator apparatus according to claim 8, wherein the operation unit obtains the operation information of the operator from the first authentication unit and records a history of the operation input to the input unit by the operator in an operation history database in relation to the operator information.

11. The plant operation training simulator apparatus according to claim 8, wherein the input unit is a touch panel displayed on the screen of a display device.

12. The plant operation training simulator apparatus according to claim 8, wherein the plant simulator includes an instructor console for setting a plant anomaly event, the instructor console including:

a second apparatus-side communication unit having a second touch electrode for reading the operator ID from the mobile communication unit through living-body communication; and a second authentication unit that obtains the operator ID from the second apparatus-side communication unit to authenticate the operator.

13. The plant operation training simulator apparatus according to claim 8, wherein the authentication unit determines whether the operator that is currently in contact with the touch electrode is an operator who is qualified to operate an apparatus performing the inputted operation.

14. The plant operation training simulator apparatus according to claim 8, wherein the authentication unit records a time of the authentication and the operator ID.

15. The plant operation training simulator apparatus according to claim 8, wherein the operator information database stores authentication data used for authenticating the operator, the authentication data includes at least one operator ID, at least one operator name, and at least one qualification for operation that indicates if a corresponding operator is qualified to operate the plant operation apparatus.

* * * * *